US006384826B1

(12) United States Patent
Bern et al.

(10) Patent No.: US 6,384,826 B1
(45) Date of Patent: May 7, 2002

(54) METHOD, APPARATUS AND COMPUTER MEDIUM FOR SURFACE RECONSTRUCTION BY VORONOI FILTERING

(75) Inventors: Marshall Wayne Bern, San Carlos, CA (US); Annamaria B. Amenta, Austin, TX (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/133,947

(22) Filed: Aug. 14, 1998

(51) Int. Cl.[7] .............................................. G06T 11/20
(52) U.S. Cl. ........................ 345/441; 345/420; 345/423; 345/427; 345/442; 345/443; 345/581
(58) Field of Search .................................. 345/427, 429, 345/425, 473, 420, 423, 441, 442, 443, 581

(56) References Cited

U.S. PATENT DOCUMENTS

| 5,850,229 A | * 12/1998 | Edelsbrunner et al. ...... 345/473 |
| 5,886,702 A | * 3/1999 | Migdal et al. ............... 345/423 |
| 6,133,921 A | * 10/2000 | Turkiyyah et al. ........... 345/420 |

OTHER PUBLICATIONS

Chen et al., "Shortest Paths on a Polyhedron", Department of Computer Science University of Kentucky, 1990 ACM, pp. 360–369.*

Guha, "An Optical Mesh Computer Algorithm for Constrained Delaunay Triangulation", Electrical Engineering & Computer Science University of Wisconsin Milwaukee, IEEE 6/94, pp. 102–109.*

Amenta, N. and Bern, M., "The Crust and the β–Skeleton: Combinatorial Curve Reconstruction," *Graphical Models and Image Processing*, vol. 60/2, No. 2, Mar. 1998, pp. 125–135.

Amenta, N., Bern, M. and Kamvysselis, M., "A New Voronoi–Based Surface Reconstruction Algorithm," *Proc. SIGGRAPH*, 1998, pp. 415–421.

Amenta, N. and Bern, M., "Surface Reconstruction by Voronoi Filtering," *Proceedings of the Annual Symposium on Computational Geometry*, (ACM), 1998, pp. 39–48.

Attali, D., "r–Regular Shape Reconstruction from Unorganized Points," *Proceedings of the ACM Symposium on Computational Geometry*, 1997, pp. 248–253.

(List continued on next page.)

*Primary Examiner*—Mark Zimmerman
*Assistant Examiner*—Kimbinh T. Nguyen
(74) *Attorney, Agent, or Firm*—Flieslier, Dubb, Meyer & Lovejoy LLP (57) ABSTRACT

A surface reconstruction system generates a "crust" to re-construct d dimensional surfaces from a set of sample points. A Voronoi diagram, which comprises a plurality of Voronoi cells and Voronoi vertices, is generated from the sample points to define the geometric shape of the Voronoi cells. The surface features of the original surface are re-constructed from the geometric shape of the Voronoi cell through selection of a subset of Voronoi vertices of the Voronoi diagram so as to approximate the medial axis of the original surface. In one embodiment, a subset of Voronoi vertices of the Voronoi diagram are selected by designating at least one pole for a corresponding Voronoi cell. The surface reconstruction technique also computes a Deluanay triangulation from the sample points and the poles, and then filters triangles from the Deluanay triangulation in which all three vertices are not sample points. As a final step for trimming the crust, all triangles with an edge not adjacent to another triangle are removed, and the inside or outside union of the triangles is taken.

20 Claims, 11 Drawing Sheets

OTHER PUBLICATIONS

Bajaj, C.L., Bernardini, F. and Xu, G., "Automatic Reconstruction of Surfaces and Scalar Fields from 3D Scans," *Computer Graphics (Proc. SIGGRAPH)*, 1995, pp. 109–118.

Boissonnat–J.–D., "Geometric Structures for Three–Dimensional Shape Representation," *ACM Transactions on Graphics*, vol. 3, No. 4, Oct. 1984, pp. 266–286.

Clarkson, K.L., Mehlhorn, K. and Seidel, R., "Four Results on Randomized Incremental Constructions," *Computational Geometry: Theory and Applications*, 1993, 29 pp.

Clarkson, K., "A Program for Convex Hulls," http://cm.bell–labs.com/netlib/voronoi/hull.html.

Curless, B. and Levoy, M., "A Volumetric Method for Building Complex Models from Range Images," *Computer Graphics (Proc. SIGGRAPH)*, 1996, 10 pp.

Deering, M., "Geometry Compression," *Computer Graphics (Proc. SIGGRAPH)*, 1995, pp. 13–20.

Edelsbrunner, H. and Mücke, E.P., "Three–Dimensional Alpha Shapes," *ACM Transactions on Graphics*, vol. 13, No. 1, Jan. 1994, pp. 43–72.

Hoppe, H., DeRose, T., Duchamp, T., McDonald, J. and Stuetzle, W., "Surface Reconstruction from Unorganized Points," *Computer Graphics (Proc. SIGGRAPH)*, vol. 26, No. 2, Jul. 1992, pp. 71–78.

Ogniewicz, R.L., "Skeleton–Space: a Multiscale Shape Description Combining Region and Boundary Information," *Proceedings of Computer Vision and Pattern Recognition*, Seattle, Washington, Jun. 1994, pp. 746–751.

Taubin, G. and Rossignac, J., "Geometric Compression Through Topological Surgery," *ACM Transactions on Graphics*, vol. 17, No. 2, Apr. 1998, pp. 84–115.

Turk, G. and Levoy, M., "Zippered Polygon Meshes from Range Images," *Computer Graphics (Proc. SIGGRAPH)*, 1994, pp. 311–318.

\* cited by examiner

METHOD, APPARATUS AND COMPUTER MEDIUM FOR SURFACE RECONSTRUCTION BY VORONOI FILTERING

BACKGROUND OF THE INVENTION

1. Field of the Invention

The present invention is directed toward the problem of surface reconstruction, and more particularly toward reconstructing a surface from sample points, a problem arising in many fields including the fields of computer graphics, data visualization, automated cartography, and medical imaging.

2. Art Background

In general, surface reconstruction algorithms approximate an unknown surface from an input that does not explicitly describe that surface. As a first example, in the field of computer graphics, a three-dimensional model may be scanned by a laser range finder to generate sample points that are input to a computer. A surface reconstruction algorithm is then executed to reconstruct a polygonal surface for subsequent manipulation and rendering. As a second example, a scientist studying a dynamical system may reconstruct a surface over a set of data points to ascertain whether the points lie on a smooth surface such as a low-degree polynomial.

Prior art surface reconstruction algorithms fall into two broad categories: those based on triangulation (such as the current invention) and those based on level sets. The most well-known triangulation-based algorithm is the alpha complex construction of Edelsbrunner, et al. at the University of Illinois. (See H. Edelsbrunner and E. Mücke, "Three-Dimensional Alpha Shapes", ACM Trans. Graphics, 13 (1994) pp. 43–72) Others who have used triangulation-based algorithms include Boissonat (see S. D. Boissonat, "Geometric Structures for Three-Dimensional Shape Reconstruction," ACM Trans. on Graphics 3 (1984) 266–286), Bajaj, et al. at Purdue (see C. L. Bajaj, F. Bernardini, and G. Xu, "Automatic Reconstruction of Surfaces and Scaler Fields from 3D Scans", Computer Graphics (Proc. SIGGRAPH), 1995, pp. 109–118), and Attali in Prance (See D. Attali R-Regular, "Shape Reconstruction from Unorganized Points", Proceedings of the ACM Symposium on Computational Geometry, 1997, pp. 248–253). The weakness of the alpha complex is that it assumes a global size parameter, alpha, and hence does not work very well for adaptively sampled surfaces. A more general weakness of all triangulation-based algorithms up until the present invention is spurious holes appearing in the surface where four sample points happen to be cocircular.

Level-set algorithms have been devised by a number of research groups, most notably at the University of Washington (See H. Hoppe, T. DeRose, T. Duchamp, J. McDonald, and W. Stuetzle, "Surface Reconstruction from Unorganized Points", Computer Graphics (Proc. SIGGRAPH), 1992, pp. 71–78) and at Stanford University. (See B. Curless and M. Levoy, "A Volumetric Method for Building Complex Models From Range Images", Computer Graphics (Proc. SIGGRAPH), 1996 and G. Turk and M. Levoy, "Zippered Polygon Meshes from Range Images", Computer Graphics (Proc. SIGGRAPH), 1994, pp. 311–318) Level-set algorithms work quite well in practice, and are currently preferred over triangulation-based methods for inexact applications such as computer graphics. Two characteristics of level-set algorithms become liabilities for more exact applications such as scientific visualization: first, level-set algorithms approximate (pass nearby) rather than interpolate (pass through) the sample points; and second, level-set algorithms strongly prefer closed surfaces over surfaces with boundaries.

The surface reconstruction algorithm of the present invention is triangulation-based with provably reliable performance for both inexact and exact applications. Unlike other triangulation-based algorithms, the present invention assumes no global size parameter and avoids spurious holes. Unlike level-set algorithms, the invention gives a polygonal surface whose vertex set is exactly the set of sample points, and the invention will leave a boundary, for example a "window" into the surface, when the polygons that would fill in the boundary are not adequately supported by the data.

SUMMARY OF THE INVENTION

The surface reconstruction algorithm generates a d-dimensional surface from a set of sample points. In the typical case, the surface reconstruction algorithm reconstructs a two-dimensional surface embedded in three-dimensional space from the set of sample points. The surface reconstruction algorithm first generates the Voronoi diagram of the sample points. The Voronoi diagram represents a division of space into Voronoi cells, one Voronoi cell for each sample point, such that each sample point's Voronoi cell consists of that part of space closer to it than to any other sample point. The surface reconstruction system uses the sample points and the shapes of their Voronoi cells to determine which surface elements (triangles in the case of a two-dimensional surface in three dimensions) to include in the reconstructed surface. In one embodiment, Voronoi cell shape information includes locations of vertices, angles at vertices and edges, aspect ratio of the cell, and directions and lengths of principal axes of the cell.

For the two-dimensional surface in three dimensions embodiment, the Voronoi cell shape information is the location of one or two specially selected vertices, called "poles", from each Voronoi cell. The first pole, p+, of sample point v, is the vertex of v's Voronoi cell farthest from v. If v lies on the convex hull of the sample points, then its Voronoi cell is unbounded, and p+ is any point so that vector vp+ points in a direction in which the Voronoi cell is unbounded. In either case, the second pole p− is the vertex of v's Voronoi cell farthest from v such that vp− has negative dot product with vp+.

After the selection of poles, the surface reconstruction algorithm computes the Delaunay triangulation of the sample points and the poles and retains only those triangles in which all three vertices are sample points. In two last optional steps, the algorithm performs some further triangle filtering. Triangles may be removed based on the angle between the vector to the pole at a vertex and the normal to the triangle. Finally the algorithm extracts a two-dimensional manifold from the set of retained triangles. This manifold extraction step removes each triangle with a sharp dihedral (for example, an edge not adjacent to another triangle), and then takes the inside or outside of the union of triangles.

BRIEF DESCRIPTION OF THE DRAWINGS

FIG. 7a illustrates a Voronoi diagram of a set of sample points on a curve.

FIG. 7b illustrates the Delaunay triangulation of SUV, from the Voronoi diagram of FIG. 7a.

DETAILED DESCRIPTION

Figure 1:
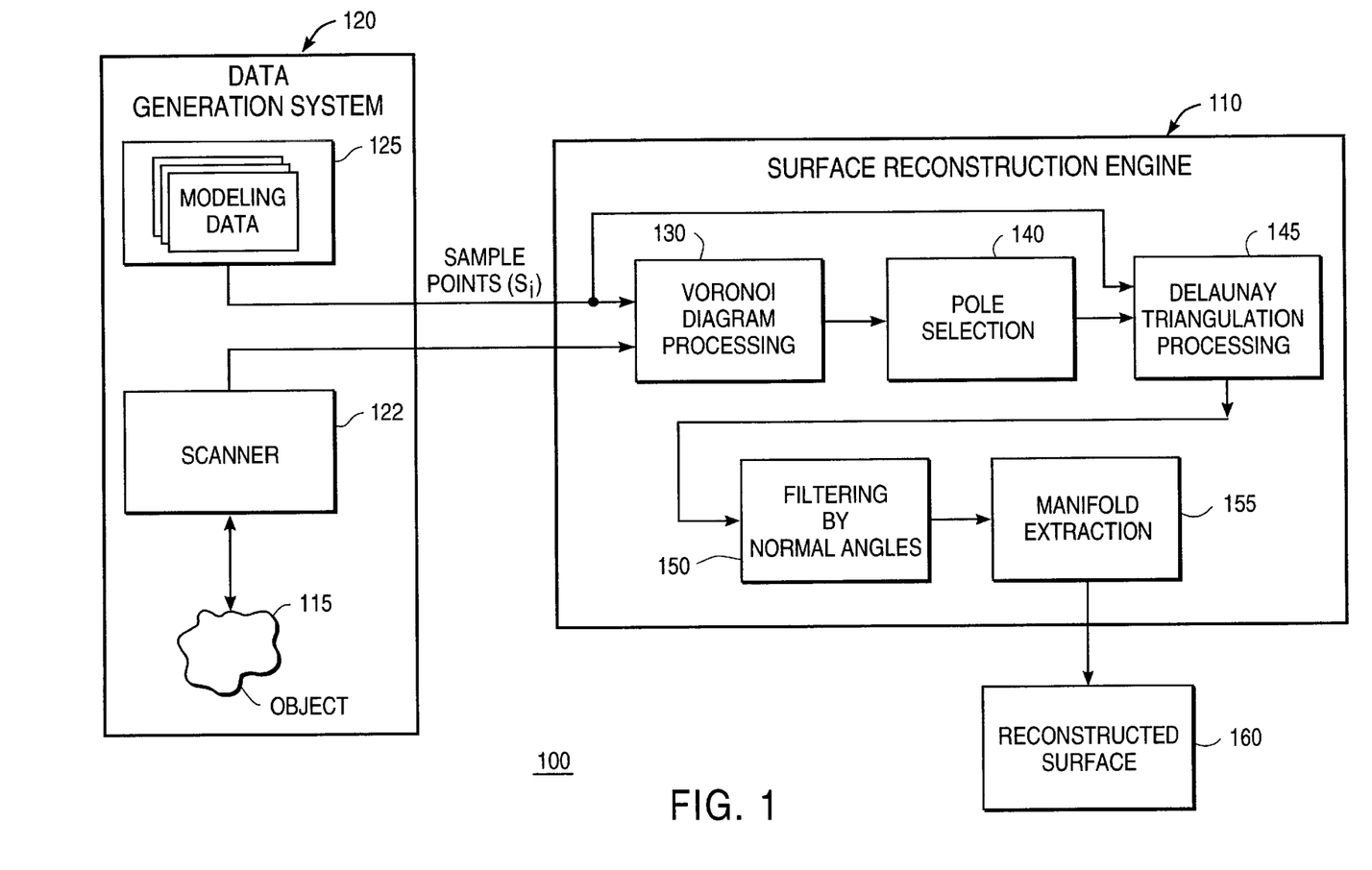
FIG. 1 is a block diagram illustrating a surface reconstruction system incorporating the present invention.

FIG. 1 is a block diagram illustrating one embodiment for the surface reconstruction system of the present invention. The core of the surface reconstruction system 100 is the surface reconstruction engine 110. In general, the surface reconstruction engine 110 receives, as inputs, sample points ($S_i$), and generates, as an output, a reconstructed surface or "crust", shown as surface reconstruction 160 on FIG. 1. The sample points ($S_i$) may be generated from any source. The surface reconstruction engine 110 assumes only that the sample points are sufficiently dense, and makes no uniformity or regularity assumptions. The definition of sufficiently dense sample points is described below. The data generation system (120) may be a laser range-finder, touch scanner, or other measuring device (e.g., scanner 122), or it may be entirely synthetic such as a numerical simulation of a physical process (e.g., modeling data 125). The data generation system 120 may produce additional data, besides point locations, such as surface normals. The embodiments described herein do not use this auxiliary information, although other embodiments could combine auxiliary information with the surface reconstruction method.

The surface reconstruction method includes modules that: compute the Voronoi diagram of the sample points (Voronoi vertices diagram processing 130); select certain Voronoi vertices to serve as poles (pole selection 140); compute the Delaunay triangulation of the sample points and the poles (Delaunay triangulation 145); extract the Delaunay triangles for which all three vertices are sample points (Delaunay triangulation 145); and further extract triangles on the basis of normal angles (filtering by normal angles 150) or global topology (manifold extraction 155). The reconstructed surface (160) is a polyhedral surface, containing triangles with vertices from the set of sample points. In the following sections, each module is described in more detail.

Figure 2:
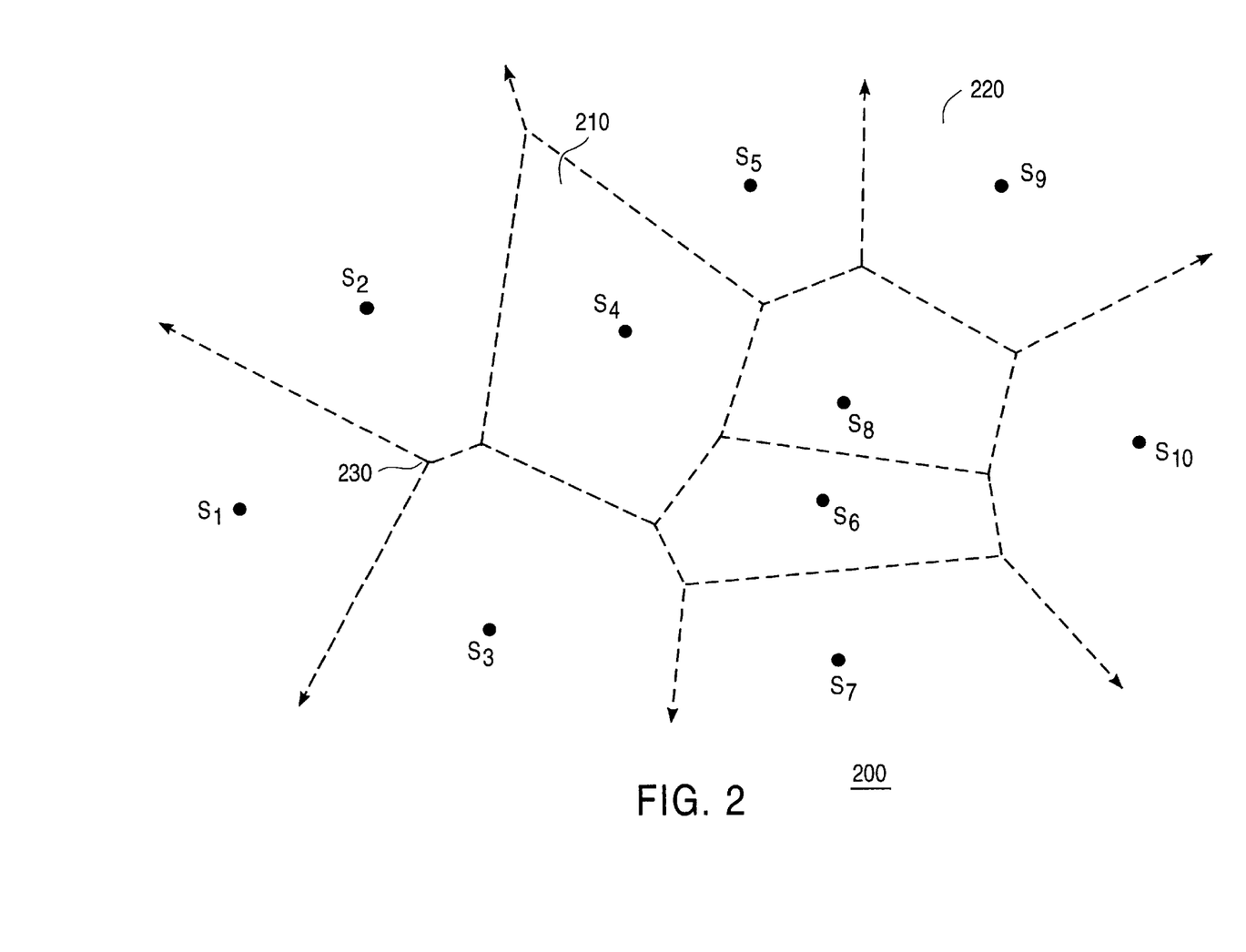
FIG. 2 is a Voronoi diagram for an example set of ten sample points in two dimensions.

Given a set of sample points $S=\{s_1, s_2, \ldots, s_n\}$, the Voronoi diagram divides space (e.g., two- or three-dimensional Euclidean space) into cells, one for each sample point, such that the cell for sample point $s_i$, denoted $Vor(s_i)$, consists of all points of space closer to $s_i$ than to any other sample point. FIG. 2 shows the Voronoi diagram for a set of ten sample points, $s_1, s_2, \ldots, s_{10}$, in two dimensions. Typically, the Voronoi diagram is in three dimensions for a two-dimensional surface, but it is easier to picture two-dimensional space. The Voronoi cells are delineated by dashed lines. Some Voronoi cells, such as $Vor(s_4)$, are bounded, whereas other, such as $Vor(s_2)$, are unbounded, as illustrated by the dashed lines, adjacent to the cell, with arrows pointing to infinity. A point at which three cells meet (four cells in three dimensions) is a Voronoi vertex. For example, the point denoted 230 is the meeting point of $Vor(s_1)$, $Vor(s_2)$ and $Vor(s_3)$.

The Voronoi diagram can be computed by standard algorithms, described in any text on computational geometry. There is also freely available software for computing the Voronoi diagram. For example, one embodiment for the Voronoi diagram processing 130 uses Ken Clarkson's Hull program to compute the Delaunay triangulation (see below), and then computes the Voronoi diagram from the Delaunay triangulation, a relatively easy task. Clarkson's Hull program uses exact arithmetic, although not essential to the methods of the present invention. In one embodiment, each Voronoi vertex in Voronoi diagram processing 130 (FIG. 1) is computed by solving a four×four linear system with a solver from LAPACK. The solver also returns the condition number of the coefficient matrix, which may be used to reject unreliable Voronoi vertices.

The surface reconstruction method takes advantage of the fact that many of the three-dimensional Voronoi vertices do lie near the medial axis. Consider the Voronoi cell Vor(s) of any one samples on a densely sampled smooth surface F. The sample s is surrounded on F by other samples, and Vor(s) is bounded by the perpendicular bisecting planes separating s from its neighbors. The Voronoi cell Vor(s) is long, thin and roughly perpendicular to F at s. The Voronoi cell Vor(s) extends to infinity, unless cut off by samples on some other part of F, in which case, the Voronoi cell Vor(s) ends somewhere near the medial axis. The surface reconstruction method of the present invention filters Voronoi vertices to find the ones close to the medial axis.

The subset of Voronoi vertices used to reconstruct the surface are called "poles." In general, the poles lie near the medial axis of the surface. The medial axis forms two-dimensional surfaces between adjacent sheets of surface and degenerates to one-dimensional curves where the cross-section of the surface is circular. In the preferred embodiment, for each sample s, only two vertices of a Voronoi cell Vor(s), located farthest from s, one on either side of the surface F, are used. The two poles are denoted as $p^+$ and $p^-$. One pole, designated $p^+$, is typically the farthest vertex of Vor(s) from s. The observation that the Voronoi cell Vor(s) is long and skinny implies that the other pole, $p^-$, must lie roughly in the opposite direction from $p^+$. For this embodiment, as discussed more fully below, the pole $p^-$ is the Voronoi vertex that is the farthest vertex from s such that a vector $(sp^-)$ from the sample point to the pole $p^-$ and the vector $(sp^+)$ from the sample point to $p^+$ has a negative dot product.

Pole Selection 140 finds Voronoi vertices located near the medial axis of the surface to be reconstructed. However, the surface and its medial axis are both unknown. The medial axis of a surface is described more fully below in conjunction with a description of FIG. 9. The pole selection step treats each sample point s, in turn; the same processing is applied to all sample points. One embodiment of pole selection is described in conjunction with FIG. 3.

Figure 3:
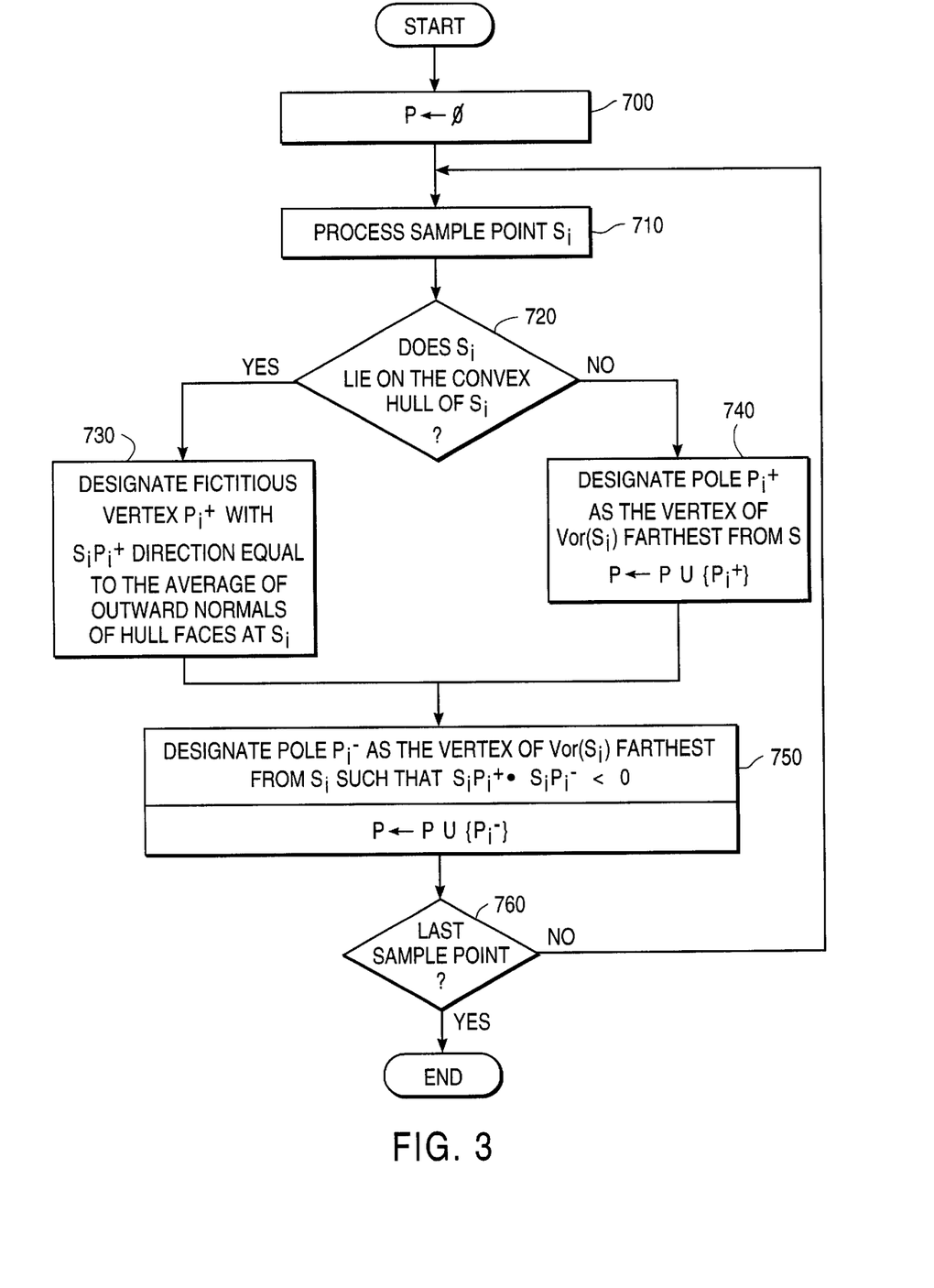
FIG. 3 is a flow diagram illustrating the preferred embodiment for selecting poles for a two-dimensional surface embedded in three dimensions.
Figure 4A:
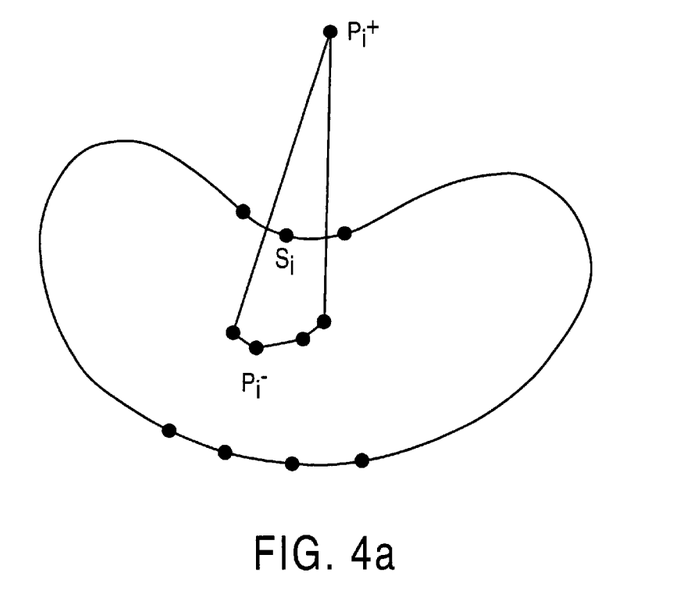
FIG. 4a illustrates the poles of unbounded Voronoi cells.

FIG. 3 is a flow diagram illustrating the preferred embodiment for selecting poles for a two-dimensional surface embedded in three dimensions. As shown in block 700 of FIG. 3, the set of poles, P, is initialized to the empty set, and the sample points $s_i$ are processed. As shown in block 720, the pole selection 140 (FIG. 1) tests whether $s_i$ lies on the convex hull of S or not. The convex hull is another standard construction in computational geometry; the status of $s_i$ (convex hull or not) is in fact in the Voronoi diagram of S. If $s_i$ does not lie on the convex hull, then $\mathrm{Vor}(s_i)$ is bounded, as shown in FIG. 4a. As shown in block 740, if $s_i$ does not lie on the convex hull, then pole selection 140 (FIG. 1) chooses the point of $\mathrm{Vor}(s_i)$ farthest from $s_i$, which is necessarily a Voronoi vertex, to be the first pole $p_i^+$ as a "fictitious" vertex.

Figure 4B:
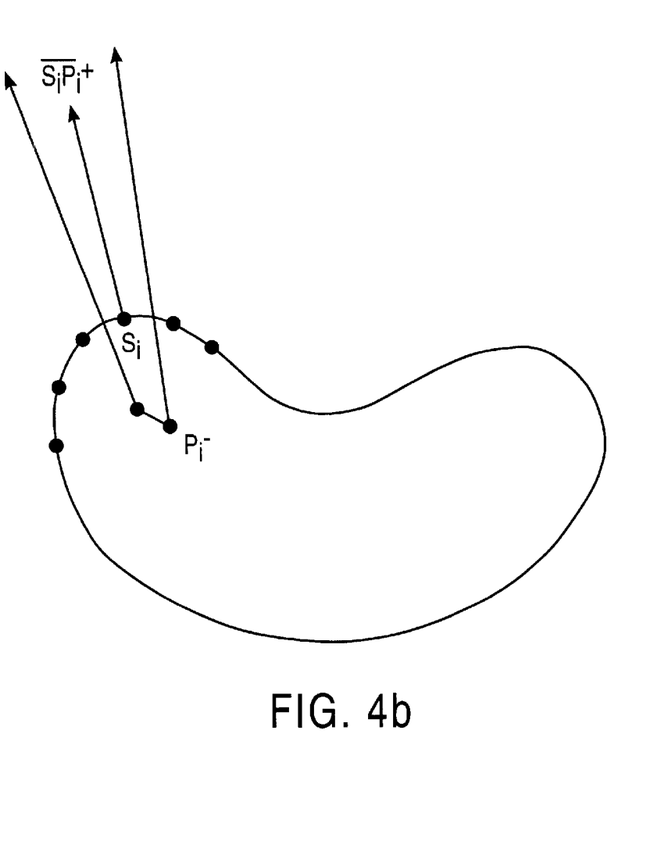
FIG. 4b illustrates the poles of bounded Voronoi cells.

If $s_i$ does lie on the convex hull, then $\mathrm{Vor}(s_i)$ is unbounded, as shown in FIG. 4b. As shown in block 730 of FIG. 3, the pole selection 140 (FIG. 1) designates the point $p_i^+$ as any point, such that the vector $s_i p_i^+$ lies within $\mathrm{Vor}(s_i)$. Only the direction to $p_i^+$ is important, not the distance, and $p_i^+$ will not be included in the eventual set of poles, P. In one embodiment, the vector $s_i p_i^+$ is calculated by averaging the outward normals of the convex hull faces incident to $s_i$.

In either case, after $p_i^+$ has been chosen, the pole selection 140 considers all vertices v of $\mathrm{Vor}(s_i)$ such that $s_i v$ has a negative projection onto the vector $s_i p_i^+$, or equivalently such that angle $v s_i p_i^+$ measures more than 90°, as shown in block 750 of FIG. 3. Of all such vertices v, the farthest one from $p_i^+$ is chosen as the second pole $p_i^-$ of $s_i$. The goal in selecting $p_i^-$ is that $p_i^+$ is the farthest Voronoi vertex on the opposite side of the surface F from $p_i^+$. This criteria is fitted so long as S is an r-sample for $r \leq 0.1$, as each Voronoi cell of an r-sample is long and skinny with long direction nearly normal to the surface.

The set of poles, denoted P, includes the $p_i^+$ selections for sample points with bounded Voronoi cells and the $p_i^-$ selections for all sample points. Each fictitious vertex, that is, the $p_i^+$ selection for a sample point with an unbounded Voronoi cell, can now be discarded, as it already served its purpose in the computation of $p_i^-$. As shown in block 760 of FIG. 3, the pole selection process is repeated for each sample point.

Many variations for pole selection are possible. For example, poles that are affine combinations of sample points and the poles just described, for example, a point one-tenth of the way from $p_i^-$ to $s_i$. This embodiment works well for slightly undersampled surfaces. Another embodiment uses, as poles, the second farthest Voronoi vertex (regardless of direction) as $p_i^-$. An additional embodiment includes using two fictitious vertices so long as the angle at $s_i$ between the vectors to the two poles measures at least some threshold. These embodiments have application for reconstructing surfaces with sharp edges, such as machine parts and buildings. For surfaces with sharp dihedrals, the second pole $p_i^-$ given by the basic embodiment may lie too close to the surface itself. These additional embodiments for pole selection provide reliable surface reconstruction, and in some cases superior to that of the basic embodiment.

For reconstructing a k-dimensional surface embedded in d dimensions, an embodiment of the pole selection 140 uses more than two poles per sample point. Each Voronoi cell is compressed ("skinny") in k dimensions and long d-k dimensions. The appropriate generalization of the basic embodiment finds all the Voronoi vertices extreme in the d-k long dimensions, that is, all the Voronoi vertices appearing on the convex hull in a projection onto a (d-k)-flat approximately parallel to the d-k dimensions in which the cell is long. This flat may be computed using the d-k principle axes of the Voronoi cell, or spanned by the longest sides of a minimum enclosing rectangular parallelopiped. Thus, in the case of a two-dimensional surface in three dimensions, the poles are the two extreme vertices in a projection onto a line roughly parallel to the Voronoi cell's longest dimension.

Figure 5:
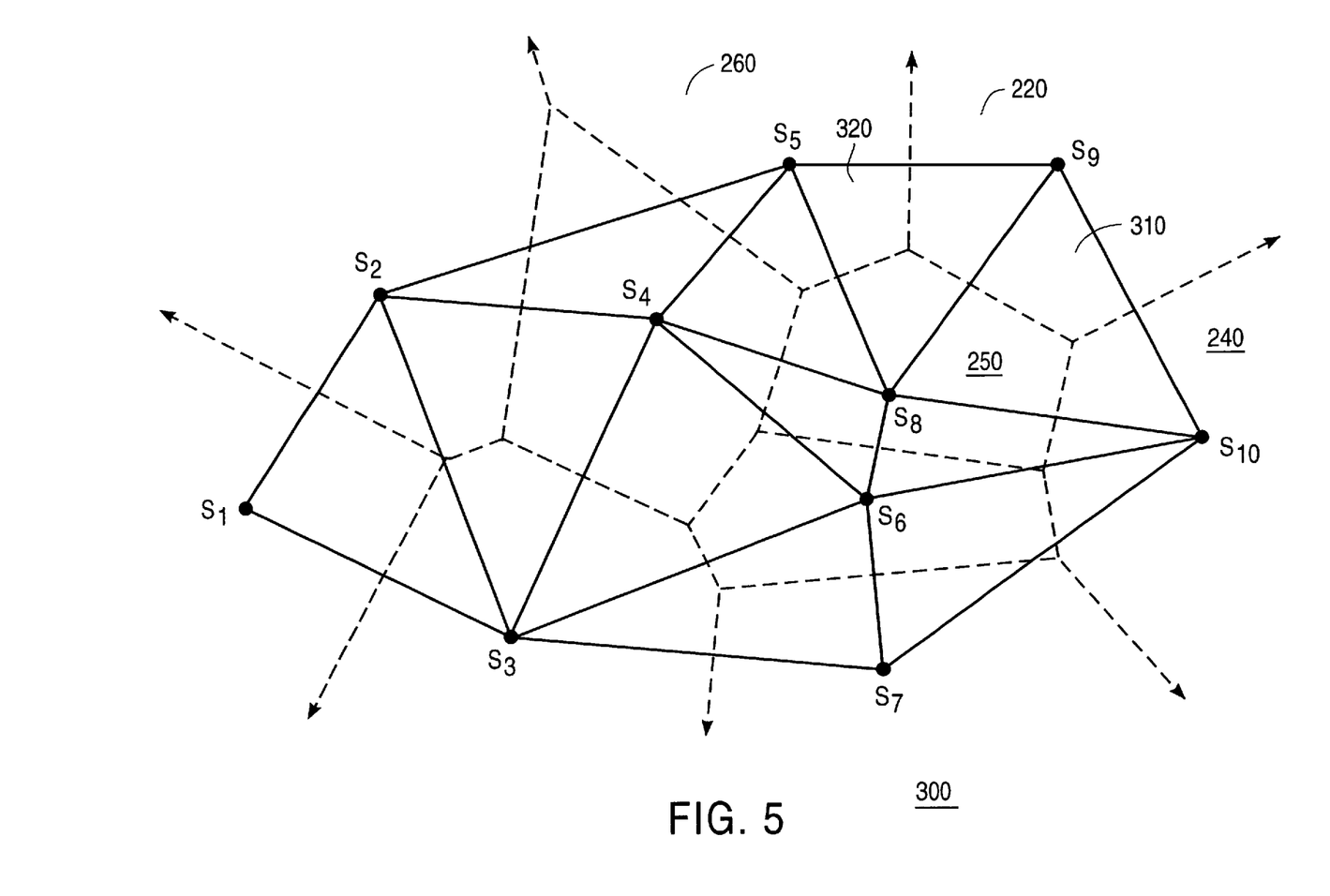
FIG. 5 illustrates the Delaunay triangulation for the example set of FIG. 2.

After selecting the poles, the surface reconstruction method computes the Delaunay triangulation (FIG. 1, 145), a standard construction in computational geometry. FIG. 5 illustrates a Delaunay triangulation for an example set of sample points $\{S_1, S_2, S_3, \ldots S_{10}\}$. The example set of sample points are the same sample points as those illustrated in FIG. 2. In two dimensions, the Delaunay triangulation includes a triangle for each triple of sample points whose Voronoi cells meet. In three dimensions, the Delaunay triangulation includes a tetrahedron for each set of four sample points whose Voronoi cells meet. For example, as shown in FIG. 5, Voronoi cell 220, which contains sample point $S_9$, meets $\mathrm{Vor}(s_{10})$, $\mathrm{Vor}(s_8)$, and $\mathrm{Vor}(s_5)$. With regard to sample point $S_9$, a Delaunay triangulation results in a triangle with vertices $S_8$, $S_9$, and $S_{10}$, as well as a second triangle with vertices $S_9$, $S_8$, and $S_5$. Thus, there is a triangle with vertices $s_5$, $s_8$ and $s_9$, because the Voronoi cells of these three sample points meet at a Voronoi vertex.

Specifically, the surface reconstruction method computes the Delaunay triangulation of $S \cup P$, (i.e., the union of the sample points and the non fictitious poles). In one embodiment, the Delaunay triangulation is computed using the same program used to compute the Voronoi diagram, for example "A Program for Convex Hulls", available on the Internet at http://cm.bell-labs.com/netlib/voronoi/hull.html. ("Clarkson's Hull Program"). Clarkson's Hull Program uses exact integer arithmetic, and hence is thoroughly robust, produces exact output, and requires no arithmetic tolerancing parameters. The Hull Program outputs a list of Delaunay tetrahedra, but not the coordinates of their circumcenters (the dual Voronoi vertices) which always contain some roundoff error. However, for the surface reconstruction of the present invention, the exact positions of the poles are not important, as the numerical error is tiny relative to the distance between the poles and the surface.

Greater improvements in efficiency may be obtained by switching to a three-dimensional Delaunay triangulation program that does not use exact arithmetic. The run time of the Delaunay triangulation is dominated by the time required to compute the Delaunay triangulations. Clarkson's Hull Program uses an incremental algorithm, so the run time is sensitive to the input order of the vertices. The triangulation algorithm builds a search structure concurrently with the triangulation itself, so that the process is analogous to sorting by incrementally building a binary search tree. When points are added in random order, the search structure is balanced (with extremely high probability) and the expected running time is optimal. In practice, random insertions are slow on large inputs because of memory paging operations. In one embodiment, performance is enhanced by inserting a random subset of a few thousand points to provide a balanced initial structure, and then inserting the remaining points based on a crude spatial subdivision to improve locality. Although the Delaunay triangulation may be performed using the Hull computer program, a specific Delaunay triangulation algorithm is not essential to the surface reconstruction techniques of the present invention. For a further explanation of Delaunay triangulation, also see K. Clarkson, K. Melhorn and R. Seidel, "Four Results on Randomized Incremental Constructions", Computational Geometry: Theory and Applications, 1993.

In one embodiment, additional filtering is performed on the basis of the normal angles of the triangles (FIG. 1, 150).

Assuming S is an r-sample for an appropriately small r such as $r \leq 0.1$, the vectors $s_i p_i^+$ and $s_i p_i^-$ are guaranteed to be nearly normal to the surface at $s_i$. Thus, a triangle T can be discarded if its normal differs from one of these vectors at one of its vertices by more than a predetermined threshold. In one embodiment, this threshold equals 30°. Filtering by normal angles is an effective technique for discarding spurious triangles, for example, triangles connecting separate connected components of the surface.

Even after filtering by normal angles, the set of retained triangles may contain some redundant triangles. For example, all four triangles of a "sliver" tetrahedron (a very flat tetrahedron in which the ratio of the circumradius to the shortest edge length is not overly large) may have passed through all the previous filtering steps. In one embodiment, the surface reconstruction technique performs the step of manifold extraction (FIG. 1, 155) to extract a two-dimensional manifold.

In one embodiment of manifold extraction, triangles are first oriented "inside" and "outside" according to a breadth-first search. The processing starts from any sample point $s_i$ and designates $p_i^+$ as "outside" and $p_i^-$ as "inside". The manifold extraction processing then selects any triangle T incident to $s_i$ and defines the outside side of T to be the one visible from some point on $sp_i^+$. Manifold extraction subsequently orients the poles of the other vertices to agree with this assignment and orients each triangle sharing a vertex with T so that they agree on the orientations of their shared poles. This process continues by breadth-first search until all poles and triangles have been oriented.

In a triangulated piecewise-linear two-dimensional manifold, two triangles meet at each edge, with outside sides together and inside sides together. The manifold extraction step enforces this same property in the reconstructed surface. Defining a sharp edge in the current collection of triangles to be an edge with a dihedral angle greater than 270° between adjacent triangles in the cyclic order around the edge, the manifold extraction step removes all triangles with sharp edges. The remaining triangles form a "quilted" surface, in which each edge bounds at least two triangles, with consistent orientations. The manifold extraction step computes the outside of this quilted surface by a breadth-first search on triangles, similar to the breadth-first search that oriented the triangles.

Figure 6:
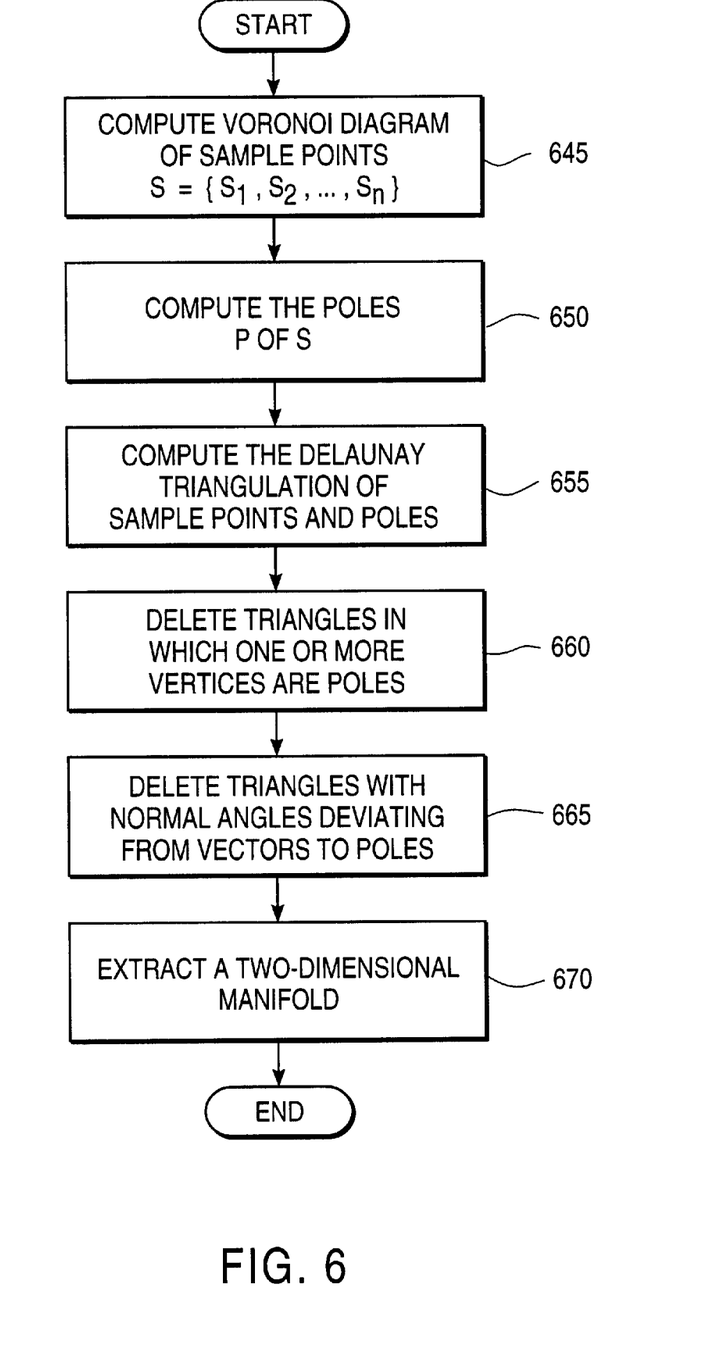
FIG. 6 is a flow diagram illustrating the preferred embodiment for reconstructing a two-dimensional surface embedded in three dimensions.

FIG. 6 is a flow diagram illustrating the preferred embodiment for reconstructing a two-dimensional surface embedded in three dimensions. The flow diagram of FIG. 6 highlights the steps of the surface reconstruction method described above. As shown in block 645, the Voronoi diagram is computed for the sample points of S ($S=[S_1, S_2, \ldots S_n]$). As shown in block 650, a set of poles, P, are computed for the sample points. The computation of a set of poles is discussed above. As shown in block 655, the Delaunay triangulation of the sample points and poles is computed. From the Delaunay triangulation, output triangles, in which one or more sample points are poles, are deleted, as shown in block 660. As shown in block 665, triangles with normal angles deviating from vectors to poles, are deleted. As a final processing step, a two-dimensional manifold is extracted, as shown in block 670.

The Reconstruction of One-Dimensional Surfaces in Two Dimensions

Figures 7A, 7B:
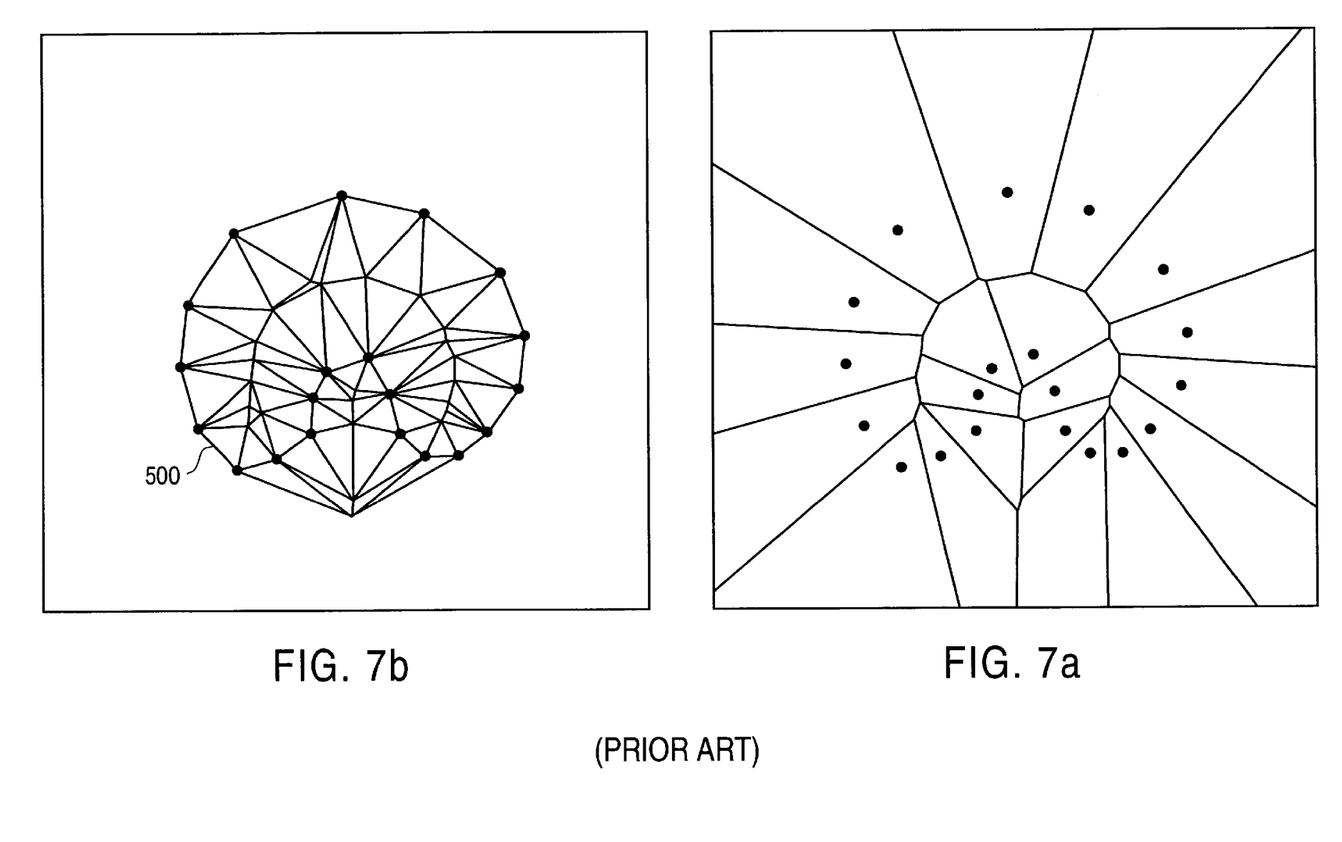

For the case of reconstructing 1-dimensional surfaces (curves) in two dimensions, all Voronoi vertices are simply designated as poles. Then, using the set of Voronoi vertices (V), the Delaunay triangulation of (S∪V) is computed. FIG. 7a illustrates a Voronoi diagram of a set of sample points on a curve. Specifically, FIG. 7a illustrates the case of reconstructing a 1-dimensional surface (curve) in two dimensions. Note that for each sample point, there is a corresponding Voronoi cell. A publication GRAPHICAL MODELS AND IMAGE PROCESSING, Vol. 60/2, No. 2, March, pp. 125–135, 1998, Article No. IP980465, the article entitled "The Crust and the β-Skeleton: Combinatorial Curve Reconstruction", Authors: Nina Amenta, Marshall Bern and David Eppstein, describes the case of reconstructing a 1-dimensional surface (curve) in two dimensions.

Figure 7C:
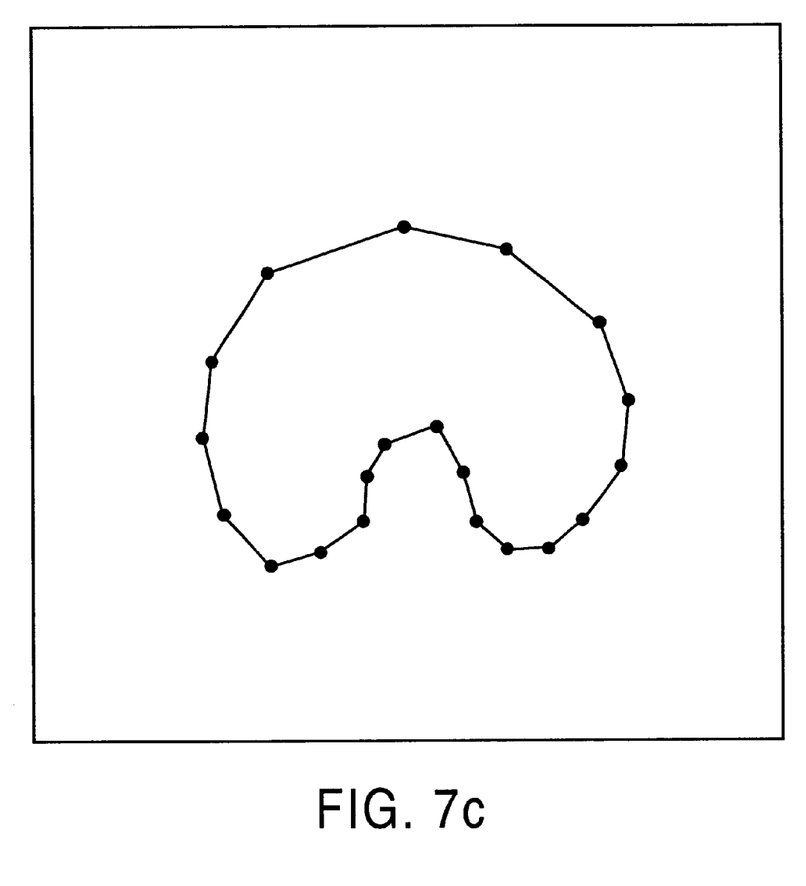
FIG. 7c illustrates a reconstructed curve that includes exactly those edges from the edges of the Delaunay triangulation whose endpoints are both sample points.

FIG. 7b illustrates the Delaunay triangulation of S∪V, with the crust edges (i.e., surface reconstruction) consisting of a thick line, designated 500 on FIG. 7b. FIG. 7c illustrates a reconstructed curve that includes exactly those edges from the edges of the Delaunay triangulation whose endpoints are both sample points.

Figure 8:
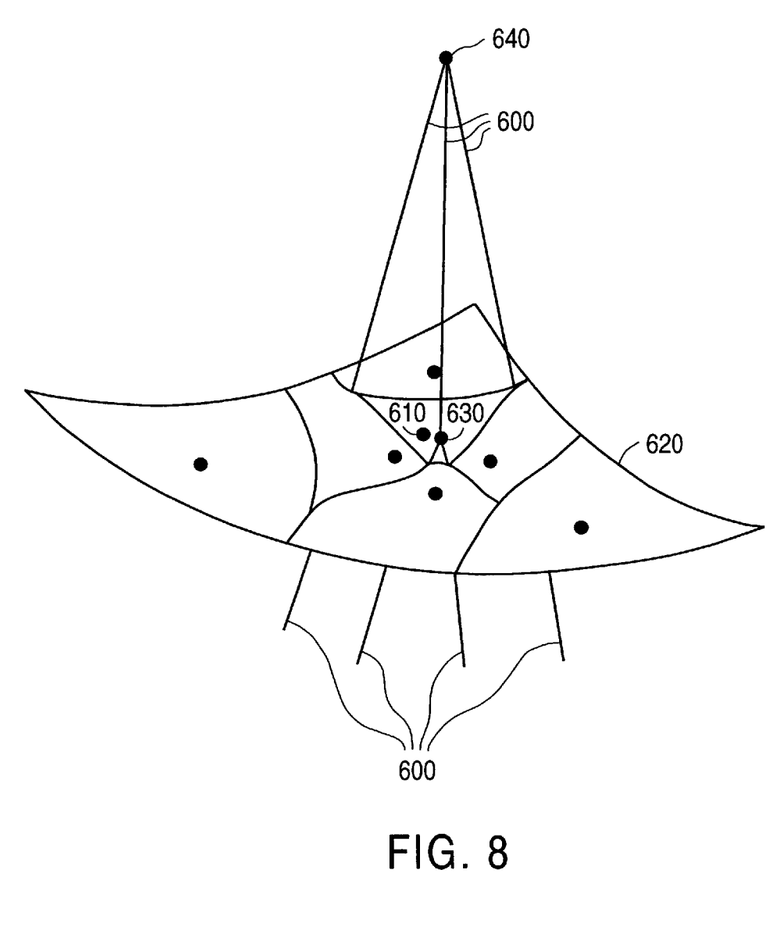
FIG. 8 illustrates an output crust generated from the prior art algorithm (SUV).

The prior art algorithm does not extend to three dimensions. As shown in FIG. 8, in three dimensions, regardless of the sampling density, Voronoi vertices can appear arbitrarily close to the surface. The present invention uses only a subset of the Voronoi vertices to avoid the problem of badly placed Voronoi vertices. Specifically, the example of FIG. 8 includes seven sample points. One of the sample points on the curved surface 620 is labeled 610, and the edges of its three-dimensional Voronoi cell are labeled 600. As shown in FIG. 8, a Voronoi vertex, labeled 630, lies near the surface 620, equidistant from the four samples near the center. The other Voronoi vertex, labeled 640, lies near the medial axis. Thus, Voronoi vertex 630 does not contribute to the approximation of the medial axis of surface 620.

Provable Reliability of the Surface Reconstruction Method

Figure 9:
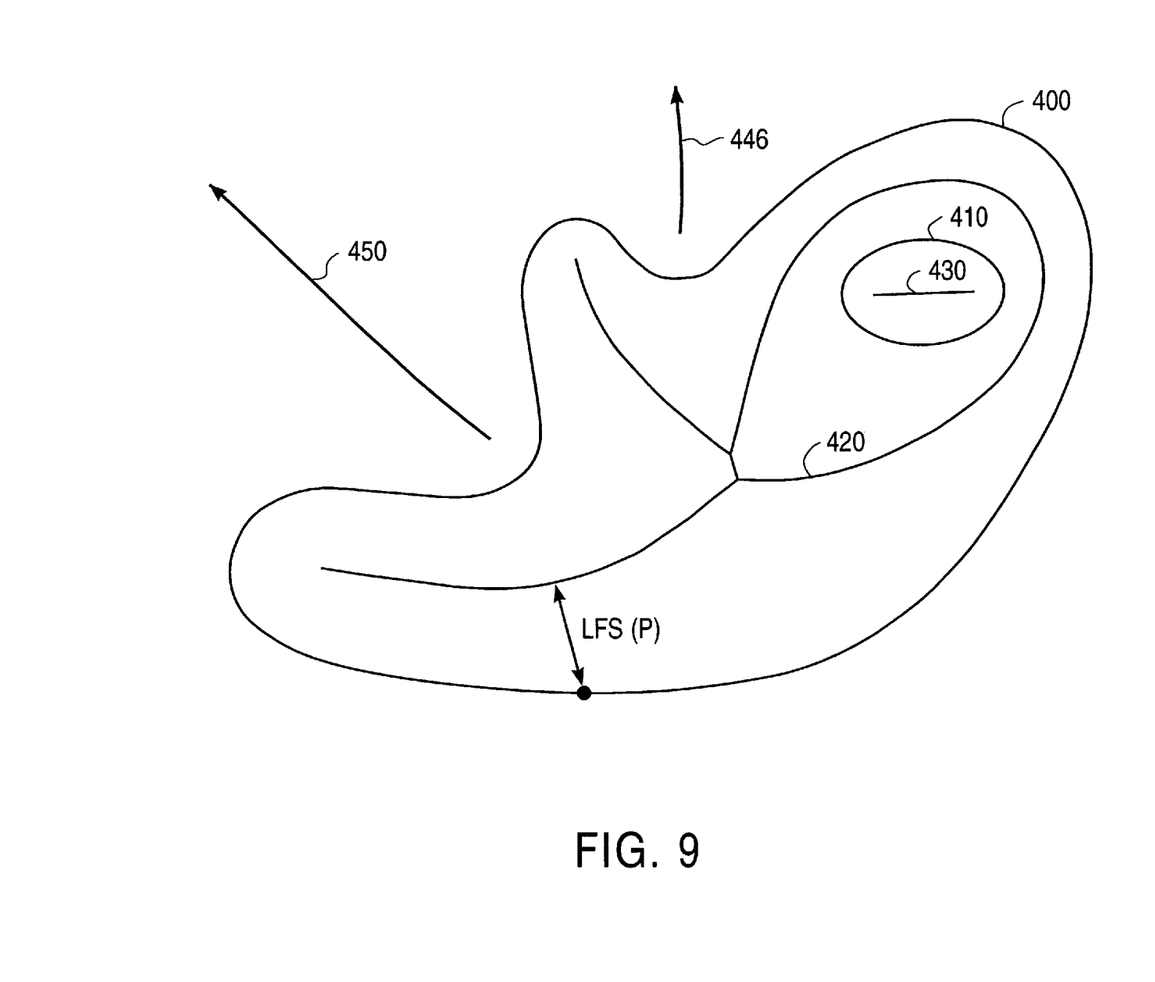
FIG. 9 illustrates the medial axis of a smooth curve in two dimensions.

The provable reliability of the surface reconstruction method is a set of mathematical theorems, best stated using the concept of the medial axis. The medial axis of a (d−1)-dimensional surface in d-dimensional space is the (closure of) the set of points with more than one closest point on the surface. FIG. 9 shows the medial axis of a 1-dimensional surface (a curve) embedded in two dimensions. Notice that the curve includes two connected components marked 400 and 410. The medial axis includes one connected component interior to the curve (marked 420) and two connected components exterior to the curve (446 and 450).

The local feature size LFS(p) at a point p on the surface is defined to be the distance from p to the nearest point of the medial axis of the surface. Generally, LFS(p) is the minimum of two quantities: the radius of curvature at p, and half the distance from to the nearest "other part" of the surface. The set of sample points S is called an r-sample of the surface F, where r is a real number between zero and one, if no point p on F is farther than r·LFS(p) from a sample point. The values of r stated in the theorems are fairly small (for example, $r \leq 0.06$), but empirically the surface reconstruction method performs well for much sparser sample sets (for example, $r \approx 0.5$).

The definition of r-sample places no constraints on the distribution of sample points other than on their density. Points may be spaced with extreme nonuniformity. Secondly, the definition of r-sample requires infinite sampling density at sharp corners and edges (where the surface is nondifferentiable). In practice, however, the surface reconstruction method performs fairly well on examples with sharp corners and edges. Finally, the definition of r-sample requires dense sampling on both sides of a thin plate in order to resolve the two sides as separate surfaces. For this example, an r-sample differs from the distribution of vertices typically produced by mesh simplification algorithms, which only need to consider curvature.

The number r appears in the theoretical analysis of the surface reconstruction method, but is not part of the method itself. Thus, a user of the surface reconstruction system 100 does not need to set r; this number is only a guideline to be used in the data collection system 120.

Two theorems for the preferred embodiment of the surface reconstruction method follow. If S is an r-sample for $r \leq 0.1$ of a smooth, two-dimensional surface P embedded in three dimensions, then the reconstructed surface includes a set of triangles forming a polyhedron homeomorphic to F. If S is an r-sample for $r \leq 0.06$, then the reconstructed surface lies within a fattened surface formed by placing a ball of radius 5rLFS(p) around each point p on F. There are additional, stronger theorems for stating the effectiveness of the filtering by normal angles and manifold extraction processing.

Computer System

Figure 10:
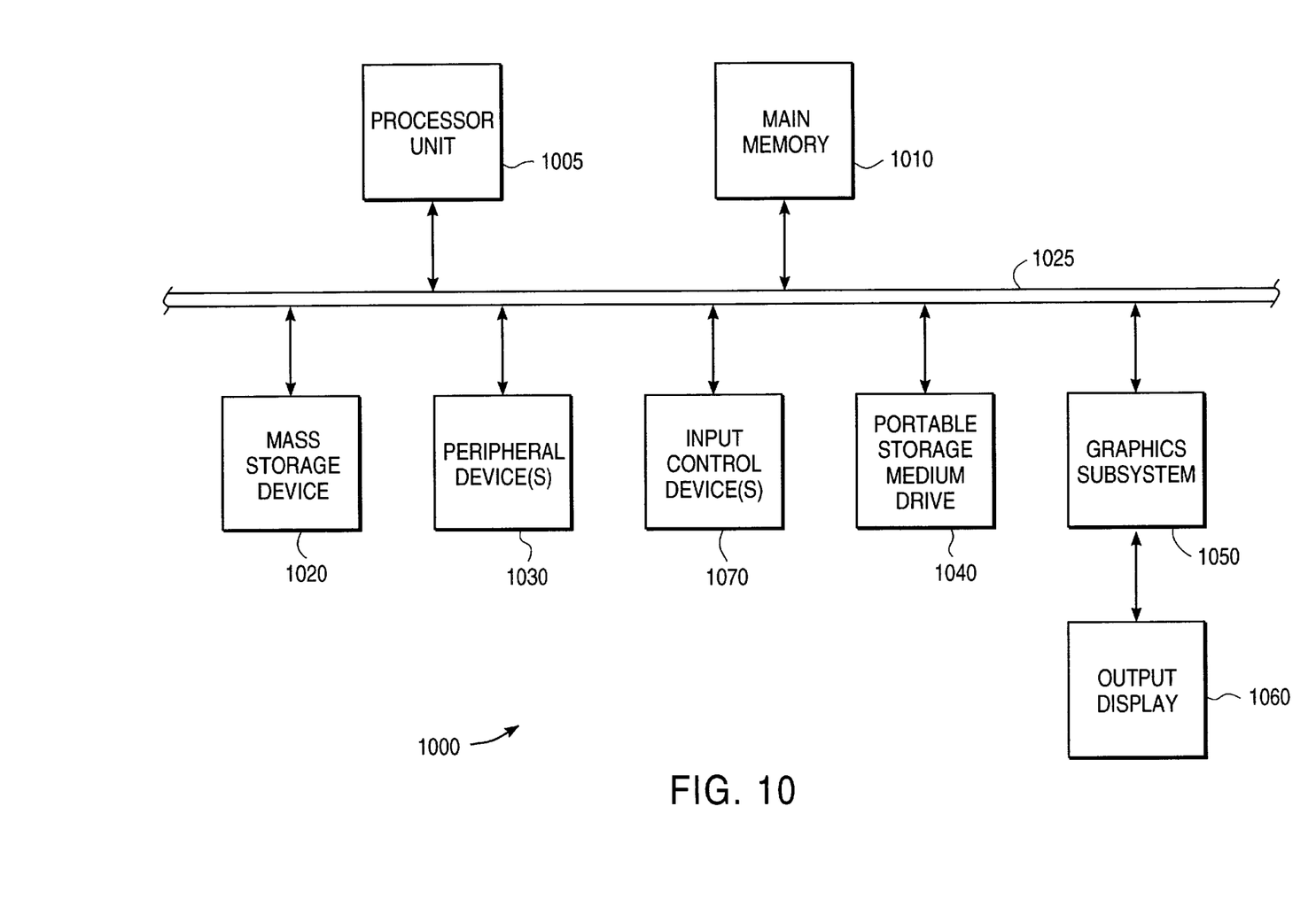
FIG. 10 illustrates a high level block diagram of a general purpose computer system in which the surface reconstruction method of the present invention may be implemented.

FIG. 10 illustrates a high level block diagram of a general purpose computer system in which the surface reconstruction system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the surface reconstruction system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 10 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the surface reconstruction system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the surface reconstruction software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the input sample points may be input to the computer system 1000 via a portable storage medium or a network for processing by the surface reconstruction system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The surface reconstruction system may be implemented in either hardware or software. For the software implementation, the surface reconstruction system is software that includes a plurality of computer executable instructions for implementation on a general purpose computer system. Prior to loading into a general purpose computer system, the surface reconstruction system software may reside as encoded information on a computer readable medium, such as a magnetic floppy disk, magnetic tape, and compact disc read only memory (CD-ROM). In one hardware implementation, the surface reconstruction system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A method for reconstructing a surface from a set of sample points, said method comprising the steps of:

generating a Voronoi diagram, comprising a plurality of Voronoi cells, from a plurality of sample points, wherein a boundary of a geometric shape for a Voronoi cell defined for a corresponding sample point comprises space closer to said corresponding sample point than any other sample point in said set of sample points; and generating a surface reconstruction from said sample points and said Voronoi diagram based on geometric shapes of said Voronoi cells, wherein the step of generating a surface reconstruction from said sample points and said Voronoi diagram based on geometric shapes of said Voronoi cells comprises the step of:

selecting a subset of Voronoi vertices of said Voronoi diagram based on a geometric shape of said corresponding Voronoi cell.

2. The method as set forth in claim 1, wherein the step of generating a surface reconstruction from said sample points and said Voronoi diagram based on geometric shapes of said Voronoi cells comprises the step of generating surface reconstruction from the location of vertices in said Voronoi diagram and angles at said vertices and said boundaries.

3. The method as set forth in claim 1, wherein the step of generating a surface reconstruction from said sample points and said Voronoi diagram based on geometric shapes of said Voronoi cells comprises the step of generating surface reconstruction from aspect ratios of said Voronoi cells and directions and lengths of principal axes of said Voronoi cells.

4. The method as set forth in claim 1, wherein the step of selecting a subset of Voronoi vertices of said Voronoi diagram comprises the step of selecting Voronoi vertices on opposite sides of said surface construction.

5. The method as set forth in claim 1, further comprising the steps of:
  computing a Delaunay triangulation from said sample points and said subset of Voronoi vertices; and
  filtering triangles from said Delaunay triangulation in which all three vertices are not sample points, wherein triangles that remain reconstruct said dimensional surface.

6. The method as set forth in claim 5, further comprising the step of trimming said surface reconstruction by removing all triangles with an edge not adjacent to another triangle, then taking the inside or outside union of said triangles.

7. A method for reconstructing a surface from a set of sample points, said method comprising the steps of:
  generating a Voronoi diagram, comprising a plurality of Voronoi cells, from a plurality of sample points, wherein a boundary of a geometric shape for a Voronoi cell defined for a corresponding sample point comprises space closer to said corresponding sample point than any other sample point in said set of sample points; and
  generating a surface reconstruction from said sample points and said Voronoi diagram based on geometric shapes of said Voronoi cells, wherein the step of generating a surface reconstruction from said sample points and said Voronoi diagram based on geometric shapes of said Voronoi cells comprises the step of:
    generating at least one pole for a corresponding Voronoi cell by selecting at least one Voronoi vertex from a Voronoi cell to approximate a medial axis of said surface through said Voronoi cell.

8. The method as set forth in claim 7, wherein the step of generating at least one pole for a corresponding Voronoi cell comprises the step of selecting poles that are the farthest from said sample point of said Voronoi cell and are also on opposites sides from one another.

9. A method for reconstructing a dimensional surface from a set of sample points, said method comprising the steps of:
  generating a Voronoi diagram for a plurality of sample points that includes a plurality of Voronoi vertices, wherein said Voronoi diagram comprises a plurality of Voronoi cells that define, for a corresponding sample point, all sample points of space closer to said corresponding sample point than any other sample point;
  generating at least one pole for a corresponding Voronoi cell by selecting at least one Voronoi vertex from a Voronoi cell to approximate a medial axis of said surface through said Voronoi cell;
  computing a Delaunay triangulation from said sample points and said poles; and
  filtering triangles from said Delaunay triangulation in which all three vertices are not sample points, wherein triangles that remain reconstruct said "d" dimensional surface.

10. The method as set forth in claim 9, wherein the step of generating at least one pole for a corresponding Voronoi cell comprises the step of selecting as poles Voronoi vertices on opposite sides of said reconstructed surface.

11. The method as set forth in claim 9, further comprising the step of trimming said surface reconstruction by removing all triangles with an edge not adjacent to another triangle, then taking the inside or outside union of said triangles.

12. A method for reconstructing a dimensional surface from a set of sample points, said method comprising the steps of:
  generating a Voronoi diagram for a plurality of sample points that includes a plurality of Voronoi vertices, wherein said Voronoi diagram comprises a plurality of Voronoi cells that define, for a corresponding sample point, all sample points of space closer to said corresponding sample point than any other sample point;
  generating at least one pole for a corresponding Voronoi cell by selecting at least one Voronoi vertex from a Voronoi cell to approximate a medial axis of said surface through said Voronoi cell, wherein the step of generating at least one pole for a corresponding Voronoi cell comprises the steps of:
    determining whether a sample point for a Voronoi cell lies on its convex hull;
    if said sample point does lie on its convex hull, calculating a vector, sp+, with a direction extending outwards between normals of adjacent Voronoi cells, and selecting, as a pole, a Voronoi vertex with negative projection on said vector sp+ that is farthest from said sample point; and
    if said sample point does not lie on its convex hull, selecting, as first pole, a Voronoi vertex farthest from said corresponding sample point, said first pole defining a vector sp+;
    selecting, as a second pole, a Voronoi vertex with negative projection on said vector sp+ that is farthest from said sample point;
  computing a Delaunay triangulation from said sample points and said poles; and
  filtering triangles from said Delaunay triangulation in which all three vertices are not sample points, wherein triangles that remain reconstruct said "d" dimensional surface.

13. A method for reconstructing a dimensional surface from a set of sample points, said method comprising the steps of:
  generating a Voronoi diagram for a plurality of sample points that includes a plurality of Voronoi vertices, wherein said Voronoi diagram comprises a plurality of Voronoi cells that define, for a corresponding sample point, all sample points of space closer to said corresponding sample point than any other sample point;
  generating at least one pole for a corresponding Voronoi cell by selecting at least one Voronoi vertex from a Voronoi cell to approximate a medial axis of said surface through said Voronoi cell, wherein the step of generating at least one pole for a corresponding Voronoi cell comprises the steps of:
    determining whether a sample point for a Voronoi cell lies on its convex hull;
    if said sample point does lie on its convex hull, calculating a vector, sp+, with a direction extending outwards between normals of adjacent Voronoi cells, wherein the step of calculating a vector sp+ for said sample point that does lie on its convex hull comprises the step of averaging the outer normals of adjacent Voronoi cells, and selecting, as a pole, a Voronoi vertex with negative projection on said vector sp+ that is farthest from said sample point; and if said sample point does not lie on its convex hull, selecting, as first pole, a Voronoi vertex farthest from said corresponding sample point, said first pole defining a vector sp+;

selecting, as a second pole, a Voronoi vertex with negative projection on said vector sp+ that is farthest from said sample point;

computing a Delaunay triangulation from said sample points and said poles; and filtering triangles from said Delaunay triangulation in which all three vertices are not sample points, wherein triangles that remain reconstruct said "d" dimensional surface.

14. A method for reconstructing a dimensional surface from a set of sample points, said method comprising the steps of:

generating a Voronoi diagram for a plurality of sample points that includes a plurality of Voronoi vertices, wherein said Voronoi diagram comprises a plurality of Voronoi cells that define, for a corresponding sample point, all sample points of space closer to said corresponding sample point than any other sample point;

generating at least one pole for a corresponding Voronoi cell by selecting at least one Voronoi vertex from a Voronoi cell to approximate a medial axis of said surface through said Voronoi cell, wherein the step of generating at least one pole for a corresponding Voronoi cell comprises the steps of:

determining whether a sample point for a Voronoi cell lies on its convex hull;

if said sample point does lie on its convex hull, calculating a vector, sp+, with a direction extending outwards between normals of adjacent Voronoi cells, and selecting, as a pole, a Voronoi vertex with negative projection on said vector sp+ that is farthest from said sample point; and if said sample point does not lie on its convex hull, selecting, as first pole, a Voronoi vertex farthest from said corresponding sample point, said first pole defining a vector sp+;

selecting, as a second pole, a Voronoi vertex with negative projection on said vector sp+ that is farthest from said sample point;

computing a Delaunay triangulation from said sample points and said poles;

filtering triangles from said Delaunay triangulation in which all three vertices are not sample points, wherein triangles that remain reconstruct said "d" dimensional surface, and;

filtering any triangles whose normals differ from a predetermined threshold from said vectors sp+ and sp–.

15. A computer readable medium comprising a set of instructions stored therein, which when executed by a computer, causes the computer to perform the steps of:

generating a Voronoi diagram, comprising a plurality of Voronoi cells, from a plurally of sample points, wherein a boundary of a geometric shape for a Voronoi cell defined for a corresponding sample point comprises space closer to said corresponding sample point than any other sample point in said set of sample points; and generating a surface reconstruction from said sample points and said Voronoi diagram based on geometric shapes of said Voronoi cells, wherein the step of generating a surface reconstruction from said sample points and said Voronoi diagram based on geometric shapes of said Voronoi cells comprises the step of:

selecting a subset of Voronoi vertices of said Voronoi diagram based on a geometric shape of said corresponding Voronoi cell.

16. The computer readable medium as set forth in claim 15, wherein the step of selecting a subset of Voronoi vertices of said Voronoi diagram comprises the step of selecting Voronoi vertices on opposite sides of said surface construction.

17. The computer readable medium as set forth in claim 15, further comprising the steps of:

computing a Delaunay triangulation from said sample points and said subset of Voronoi vertices; and filtering triangles from said Delaunay triangulation in which all three vertices are not sample points, wherein triangles that remain reconstruct said surface.

18. The computer readable medium as set forth in claim 17, further comprising the step of trimming said surface reconstruction by removing all triangles with an edge not adjacent to another triangle, then taking the inside or outside union of said triangles.

19. A computer readable medium comprising a set of instructions stored therein, which when executed by a computer, causes the computer to perform the steps of:

generating a Voronoi diagram, comprising a plurality of Voronoi cells, from a plurally of sample points, wherein a boundary of a geometric shape for a Voronoi cell defined for a corresponding sample point comprises space closer to said corresponding sample point than any other sample point in said set of sample points; and generating a surface reconstruction from said sample points and said Voronoi diagram based on geometric shapes of said Voronoi cells, wherein the step of generating a surface reconstruction from said sample points and said Voronoi diagram based on geometric shapes of said Voronoi cells comprises the step of generating at least one pole for a corresponding Voronoi cell by selecting at least one Voronoi vertex from a Voronoi cell to approximate a medial axis of said "d" dimensional surface through said Voronoi cell.

20. The computer readable medium as set forth in claim 19, wherein the step of generating at least one pole for a corresponding Voronoi cell comprises the step of selecting poles that are the farthest from said sample point of said Voronoi cell and are also on opposites sides from one another.

* * * * *